US005256246A

United States Patent [19]

Kitamura

[11] Patent Number: 5,256,246

[45] Date of Patent: Oct. 26, 1993

[54] METHOD FOR MANUFACTURING APERTURE ELECTRODE FOR CONTROLLING TONER SUPPLY OPERATION

[75] Inventor: Tetsuya Kitamura, Gifu, Japan

[73] Assignee: Brother Kogyo Kabushiki Kaisha, Nagoya, Japan

[21] Appl. No.: 8,567

[22] Filed: Jan. 22, 1993

Related U.S. Application Data

[62] Division of Ser. No. 662,824, Mar. 1, 1991.

[30] Foreign Application Priority Data

Mar. 5, 1990 [JP] Japan .................................... 2-53351

[51] Int. Cl.[5] .......................... B44C 1/22; C23F 1/00; C03C 15/00

[52] U.S. Cl. .................................... 156/643; 156/644; 156/651; 156/656; 156/657; 156/645; 156/901

[58] Field of Search ............... 156/643, 644, 645, 651, 156/655, 656, 657, 659.1, 663, 667, 901, 902; 346/155, 159

[56] References Cited

U.S. PATENT DOCUMENTS

| | | | |
|---|---|---|---|
| 4,068,585 | 1/1978 | Thompson | 346/159 X |
| 4,415,403 | 11/1983 | Bakewell | 156/901 X |
| 4,448,867 | 5/1984 | Ohkubo et al. | 346/155 X |
| 4,860,036 | 8/1989 | Schmidlin | 346/159 |
| 5,025,552 | 6/1991 | Yamaoka | 346/159 X |
| 5,077,563 | 12/1991 | Takeuchi et al. | 346/159 |

*Primary Examiner*—William A. Powell
*Attorney, Agent, or Firm*—Oliff & Berridge

[57] ABSTRACT

In an aperture electrode and a method for manufacturing the same, two metal layers are formed on both surfaces of a thin ceramic insulating substrate by a thin film forming process such as sputtering, and then plural control electrodes are formed on one surface of the substrate by patterning the metal layer on the surface with photoetching, thereby forming a basic body of the aperture electrode. Thereafter, an aperture for passing toners therethrough is formed substantially at the center of each control electrode by drilling the basic body or irradiating laser beam of an excimer laser source to the basic body.

13 Claims, 2 Drawing Sheets

METHOD FOR MANUFACTURING APERTURE ELECTRODE FOR CONTROLLING TONER SUPPLY OPERATION

This is a division of application Ser. No. 07/662,824 filed Mar. 1, 1991.

BACKGROUND OF THE INVENTION

This invention relates to an aperture electrode for controlling a supply operation of toners to an image support member to form a visible image on the image support member, and a method for manufacturing the aperture electrode used in a toner-jet type of recording apparatus.

Various kinds of image recording apparatuses utilize imaging material supply devices for supplying imaging material particles such as toners on support members. Of these devices, there has been particularly known a toner supply device in which charged toner particles are beforehand carried on a carry member and then electrostatically supplied on a support member disposed so as to confront the carry member in a gap therebetween. As this type of toner supply device, there has been proposed a toner supply device utilizing a plurality of control electrodes each having an aperture for passing toner particles therethrough. The control electrodes are placed between a toner carry member and a support member, and control flight of the toner particles through the apertures by applying image forming signals to the control electrodes to selectively charge the electrodes at a polarity opposite to the polarity of the toner particles and produce electric fields between the carry member and the control electrodes. The toner particles whose flight is controlled are positionally selectively coated on the support member to form a visible toner image corresponding to the image forming signals.

The aperture electrode of this type of toner supply device has been conventionally manufactured as follows. First, metal foils having approximately 10 μm thickness are attached through adhesive layers to both surfaces of a polymer insulating film having approximately 100 μm to form a laminate film having a multilayer structure. Next, apertures such as holes or slits are formed by an excimer laser in such a manner as to be aligned with one another on the laminate film, and then the metal foil on one surface of the laminate film is patterned by a photoetching process to form plural control electrode layers around the apertures electrically independently of one another. The metal foil comprises stainless steel, copper or the like, and the polymer insulating film comprises polyester, polyimide, polyethylene or the like.

In the manufacturing method as described above, the adhesive is used to perform attachment between the insulating electrode and the aperture electrode and between the insulating electrode and a reference electrode layer which corresponds to the other metal foil layer on the other surface of the laminate film, and thus the adhesive is liable to leak into the apertures. Accordingly, in this type of aperture electrode, the toners are frequently adsorbed by the adhesive and clogged within the apertures, so that a toner coating is interrupted, and an image forming process is not performed.

Further, the aperture electrode is disposed in a gap having 1 mm or smaller distance between the toner carry member and a counter electrode confronting the toner carry member so as not to be contacted with both of the toner carry member and the counter electrode. On the other hand, since the aperture electrode comprises a multi-layer structure in which a polymer insulating film having approximately 100 μm thickness and two metal foils having approximately 10 μm are laminated, the laminate film has a low rigidity and thus an easily deformable property due to a minute external force. Therefore, the aperture electrode is liable to contact with the toner carry member or the counter electrode. This contact causes abnormal discharge between each of the aperture electrode and at least one of the toner carry member and the counter electrode because they are supplied with a high voltage to bring electrical noises, and thus the aperture electrode is liable to be malfunctionally operated.

SUMMARY OF THE INVENTION

An object of this invention is to provide an aperture electrode of high quality in which a toner coating operation is completely performed without malfunction and thus an image forming process is accurately carried out, and a method for manufacturing the aperture electrode.

In order to attain the above object, according to one aspect of this invention, an aperture electrode has a basic body comprising a thin ceramic insulating substrate, a reference electrode formed on one surface of the ceramic insulating substrate by a thin film forming process, plural control electrodes formed on the other surface of the ceramic substrate by the thin film forming process in such a manner as to be electrically separated, and an aperture provided substantially at the center of each control electrode so as to penetrate through the basic body.

According to another aspect of this invention, a method for manufacturing the aperture electrode as described above, comprises the steps of forming a metal layer serving as a reference electrode layer on one surface of the thin ceramic insulating substrate by the thin film forming process such as sputtering, vacuum deposition, ion plating, chemical vapor deposition and screen printing, forming a pattern of plural metal layers serving as the control electrode layers on the other surface of the substrate, and thereafter forming an aperture substantially at the center of each control electrode layer so as to penetrate through the basic body.

According to the aperture electrode and the method of this invention, the reference electrode layer and the control electrode layer are formed on the ceramic substrate using no adhesive, but by the thin film forming process, so that no toner is adsorbed within the apertures. Further, the aperture electrode includes the substrate of ceramic having higher rigidity than polymer insulating film, so that the aperture electrode is prevented from contacting with both the toner carry member and the counter electrode due to an external force even when disposed in a narrow gap between the toner carry member and the counter electrode.

BRIEF DESCRIPTION OF THE DRAWINGS

FIGS. 2(A) through 2(D) show a process for manufacturing the aperture electrode as shown in FIG. 1, in which FIG. 2(A) shows a ceramic substrate, FIG. 2(B) shows a basic body of the aperture electrode which comprises the substrate and metal layers sandwiching the substrate, FIG. 2(C) shows plural control electrodes formed on the basic body as shown in FIG. 2(B), and FIG. 2(D) shows a final product in which apertures are formed substantially at the center of the control electrodes as shown in FIG. 2(C)

DETAILED DESCRIPTION OF THE INVENTION

A preferred embodiment of this invention will be described hereunder with reference to the accompanying drawings.

Figure 1:
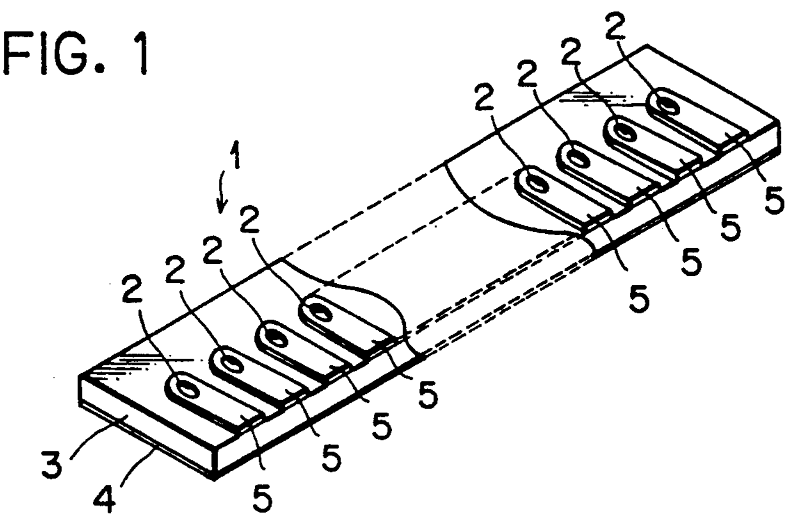
FIG. 1 is a perspective view of an aperture electrode according to this invention.

FIG. 1 is a perspective view of an aperture electrode according to this invention.

The aperture electrode 1 according to this invention has a basic body comprising a ceramic insulating substrate 3, a metal reference electrode layer 4 provided on one surface of the substrate 3 and plural control electrode layers 5 which are electrically independently or separately formed on the other surface of the substrate 3, and further includes an aperture 2 formed substantially at the center of each control electrode layer 5 so as to penetrate through the basic body. Each of the control electrode layers 5 is connected to an external circuit, and inputted with an image forming signal, and the reference electrode layer 4, for example, is grounded. A shape and an arrangement of the control electrode layers is not limited to those of FIG. 1, that is, the control electrode is not limited to an U-shaped one, and those control electrodes are not limited to be aligned with one another.

The ceramic substrate 3 has high rigidity and thus the aperture electrode 1 itself is not easily deformed, so that even when the aperture electrode 1 is applied to a toner jet type of recording apparatus, the aperture electrode is prevented from contacting both a toner carry member and a counter electrode which are supplied with high voltages, thereby preventing occurrence of abnormal discharge due to the contact between the aperture electrode and at least one of the toner carry member and the counter electrode. This effect enables an image forming apparatus adopting the aperture electrode of this invention to carry out an image forming process without malfunction because the malfunction is caused by electrical noises and these electrical noises are caused by the abnormal discharge.

FIGS. 2(A) through 2(D) show a process for manufacturing the aperture electrode as shown in FIG. 1.

Figure 2A:
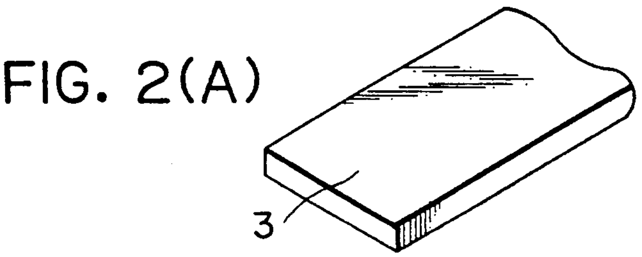
Figure 2B:
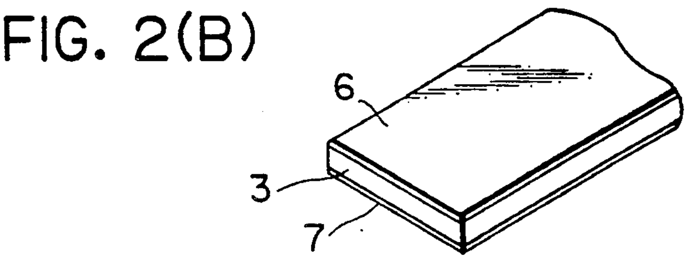

The thin ceramic insulating substrate 3 as shown in FIG. 2(A), which has a thickness from 20 to 300 μm (more preferably, 50 μm) and comprises an alumina substrate, a zirconia substrate, or R NARUTAS produced by Asahi Kasei Co., Ltd., is provided with two copper layers 6 and 7 each having 1 μm thickness on both surfaces of the substrate by a thin film forming process such as sputtering or the like as shown in FIG. 2(B). One copper layer 6 is used to form plural control electrode layers 5, and the other copper layer 7 serves as a reference electrode layer 7.

Figure 2C:
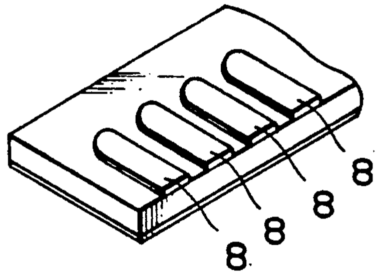
Figure 2D:
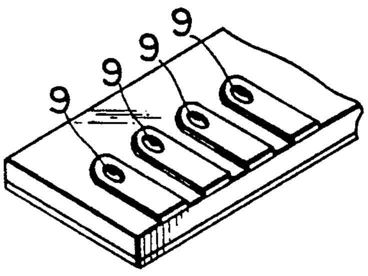

Next, as shown in FIG. 2(C), the copper layer 6 on one surface of the substrate 3 is patterned by a photoetching process to form a pattern of control electrode layers 8. The term "photoetching process" is defined as a process for forming a positive pattern through a photoresist, and then removing copper at a non-mask area with ferric chloride solution to form the pattern. Thereafter, the basic body of the aperture electrode 1 is drilled by a diamond drill to form an aperture 2 such as a hole, a slit or the like substantially at the center of each control electrode layers 5. Through the above steps, the manufacturing process of the aperture electrode 1 is completed.

The thin film forming method, such as sputtering for example, enables formation of a metal film that is closely adhesive to the substrate without the use of adhesive. Accordingly, the aperture electrode 1 manufactured by this method has no adhesive layer, which has been used in a conventional aperture electrode, and thus toners are prevented from being laminated and clogging within the apertures formed in the aperture electrode, so that an inoperable condition for image forming process due to the clogging of the toners is prevented.

Figure 3:
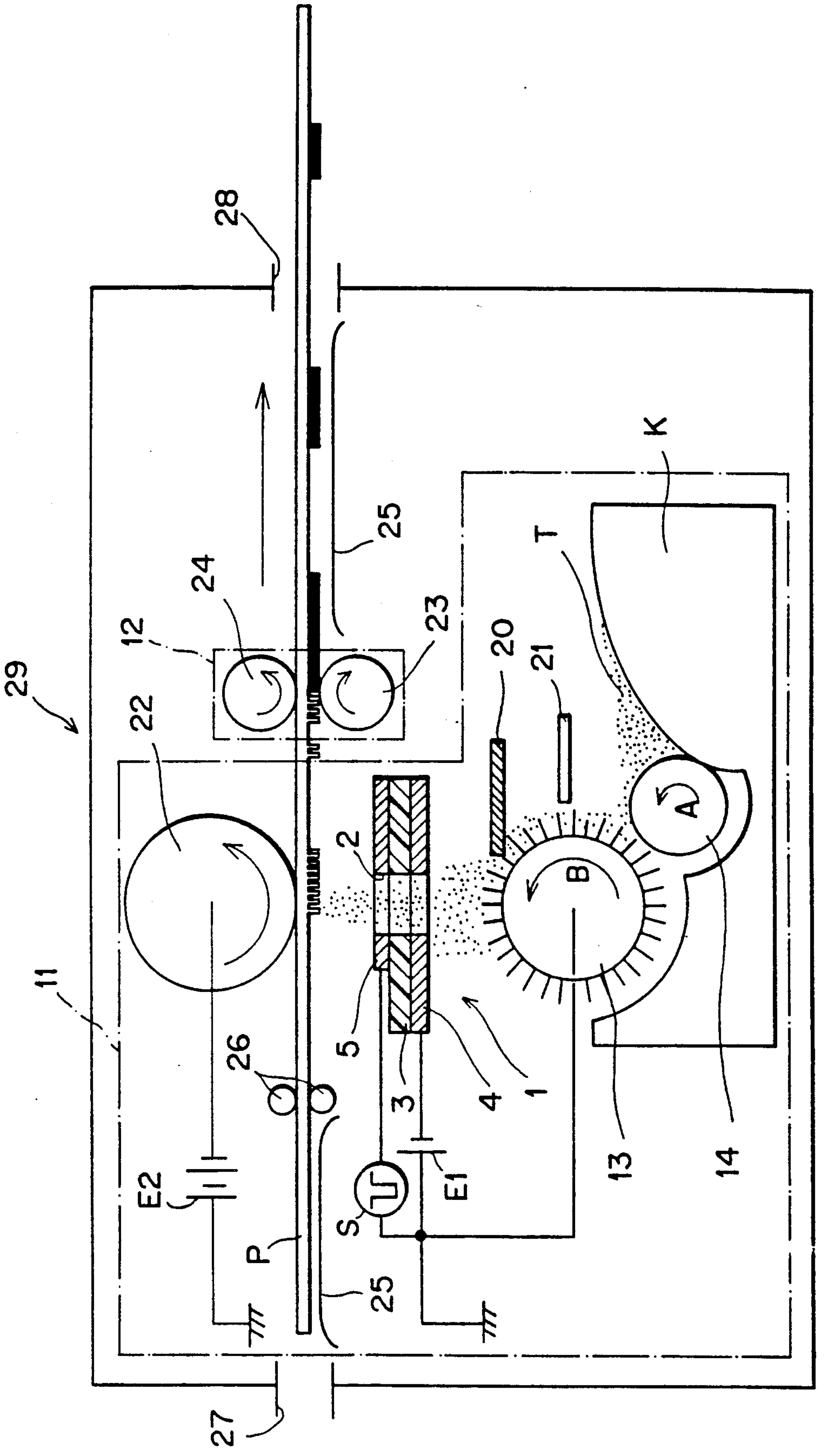
FIG. 3 shows a toner-jet type of image recording apparatus using the aperture electrode according to this invention.

FIG. 3 shows a toner-jet type of image recording apparatus using the aperture electrode as shown in FIG. 2.

The toner-jet type of image recording apparatus 29 includes a housing, a sheet inlet 27 for inserting a recording medium P therethrough and a sheet outlet 28 for discharging a thermally-fixed recording medium P therefrom, a toner coating unit 11 having the aperture electrode 1 of this invention and a thermal fixing unit 12 for thermally fixing a toner image which has been coated through the aperture electrode 1 on a recording medium P.

The toner coating unit 11 mainly includes a toner coating portion comprising a toner case K for accommodating toners T, a rotatable toner supply roller 14 for triboelectrically charging the toners T, for example, at a positive polarity through friction between the toners T and the toner supply roller 14 and carrying the charged toners T thereon and a rotatable brush roller 13 having brushes at the periphery thereof for receiving the charged toners T from the toner supply roller 14, a toner supply control portion comprising the aperture electrode 1 of this invention, and a counter electrode roller 22 supplied with a voltage having the opposite polarity to that of the toners.

A toner coating operation of the toner coating unit 11 will be described hereunder.

An image recording medium P is inserted through the sheet inlet 27, and fed along a guide member 25 to a gap between the aperture electrode 1 and the counter electrode roller 22 by a pair of feeding rollers 26. In synchronism with the insertion of the image recording medium P into the toner coating unit 11, the supply roller 14 is rotated in a direction as shown by an arrow A, so that the toners are triboelectrically charged through frictional contact with the rotating supply roller 14 and carried on the peripheral surface of the supply roller 14. The charged toners on the supply roller 14 are brought into contact with the brushes of the brush roller 13 which is rotated in a direction as shown by an arrow B, and transferred between the brushes of the brush roller 13. A brush roller member 21 is provided closely to tips of the brushes of the brush roller 13 to remove the toners supplied excessively to the brush roller 13, and a scratch member 20 is provided to elastically bend the brushes through contact between the scratch member 20 and the brushes, so that the toners filled between the brushes are elastically supplied in a mist form to the aperture electrode 1 through an elastic restoration of the brushes.

The reference electrode layer 4 is connected to a direct current power supply El and supplied with a negative voltage, so that the mist of toners each having a positive polarity are attracted to the reference electrode 4. On the other hand, the control electrode layers 5 are supplied with a modulation signal having a positive or zero voltage from a signal modulator S. Accordingly, the flow of the charged toners through the apertures 2 is directly modulated or controlled by the modulation signal supplied to the control electrode layers 5. That is, when a positive voltage is applied to the control electrode layers 5 from the signal modulator, the toners are prevented from being passed through the aperture 2, while the toners are allowed to be passed through the aperture 2 when zero voltage is applied to the control electrode layers 5 from the signal modulator S. The toners which have been passed through the apertures 2 are electrically attracted toward the counter electrode roller 22 because the polarity of the counter electrode roller 22 is opposite to that of the charged toners. Therefore, these toners are attached to the image recording medium P which is being fed through the gap between the counter electrode roller 22 and the aperture electrode 1, so that a toner image corresponding to the modulation signal is formed on the image recording medium P.

Thereafter, the image recording medium P having the toner image thereon is fed to a gap between a pair of rollers 23 and 24 of the thermal fixing unit 12 by the rotation of the rollers 26, in which the image recording medium P is supplied with heat and pressure to melt and fix the toners on the image recording medium P. The fixed image recording medium P is further fed along a guide member 25 and discharged through the sheet outlet 28.

The aperture electrode of this invention is not limited to the above embodiment, and any modification may be made as follows insofar as departing from the subject matter of this invention.

In place of the copper layer, other conductive metal layers such as aluminum, stainless steel or the like may be formed on both surfaces of the ceramic substrate. Those metal layers which are formed on both surfaces of the substrate may be identical to or different from each other. Further, vacuum deposition, ion plating, chemical vapor deposition (CVD) or screen printing method may be used as the thin film forming process in place of the sputtering. Still further, the formation of the apertures 2 may be formed by a mechanical means such as a drill, but also by an excimer laser. The excimer laser enables minute holes having several tens μm to be more accurately formed on the alumina or ceramic insulating substrate without heating the substrate in comparison with YAG and $CO_2$ lasers.

According to the aperture electrode of this invention, since the reference electrode layer and the plural control electrode layers can be formed on the substrate using no adhesive, the toners are prevented from being laminated and clogging within the apertures formed in the aperture electrode, so that an image forming process is completely and accurately performed without interruption due to the clogging of the toners within the apertures. Further, since the aperture electrode is not deformed by the external force, it is prevented from contacting with the toner carry member and the counter electrode which are supplied with high voltages. This prevents occurrence of abnormal discharge between these elements, and thus prevents the electrical noises due to the discharge. As a result, the image forming apparatus using the aperture electrode of this invention carries out an image forming process without malfunction.

What is claimed is:

1. A method of manufacturing an aperture electrode which has a plurality of apertures and equal plurality of control electrodes each being provided for each aperture, each of the control electrodes being selectively applied with an electrical voltage in accordance with an input image data for controlling flowing mode of toners passing through each of the apertures, the method comprising the steps of:

preparing a thin ceramic insulating substrate;

forming a first metal layer serving as a reference electrode on one surface of the thin ceramic insulating substrate by a thin film forming process;

forming a plurality of second metal layers each serving as the control electrodes on another surface of the substrate by the thin film forming process so as to be electrically separated from one another; and forming the apertures substantially at a center of each control electrode so as to penetrate through the control electrodes, the substrate and the reference electrode.

2. The method as claimed in claim 1, wherein said thin film forming process comprises any one selected from the group consisting of sputtering, vacuum deposition, ion plating, chemical vapor deposition and screen printing.

3. The method as claimed in claim 1, wherein said aperture forming step comprises a step of drilling the control electrode, the substrate and the reference electrode to form the aperture.

4. The method as claimed in claim 1, wherein said aperture forming step comprises a step of irradiating a laser beam from an excimer laser source to the control electrode to form the aperture.

5. The method as claimed in claim 1, wherein said second metal layer forming step comprises a step of forming a metal layer on the other surface of the substrate, and patterning the metal layer by a photoetching process to form a pattern of the second metal layers.

6. A method of manufacturing an aperture electrode which has a plurality of apertures and equal plurality of control electrodes each being provided for each aperture, each of the control electrodes being selectively applied with an electrical voltage in accordance with an input image data for controlling flowing mode of toners passing through each of the apertures, the method comprising the steps of:

preparing a thin ceramic insulating substrate;

forming a plurality of metal layers each serving as the control electrodes on one surface of the substrate by a thin film forming process so as to be electrically separated from one another; and forming the apertures substantially at a center of each control electrode so as to penetrate through the control electrodes and the substrate.

7. The method as claimed in claim 6, wherein said thin film forming process comprises any one selected from the group consisting of sputtering, vacuum deposition, ion plating, chemical vapor deposition and screen printing.

8. The method as claimed in claim 6, wherein said aperture forming step comprises a step of drilling the control electrodes and the substrate to form the apertures.

9. The method as claimed in claim 6, wherein said aperture forming step comprises a step of irradiating a laser beam from an excimer laser source to the control electrode to form the aperture.

10. The method as claimed in claim 6, wherein said plurality of metal layers forming step comprises the steps of forming a metal layer on the one surface of the substrate, and pattering the metal layer by a photoetching process to form a pattern of the plurality of metal layers.

11. The method as claimed in claim 10, wherein said thin film forming process comprises any one selected form the group consisting of sputtering, vacuum deposition, ion plating, chemical vapor deposition and screen printing.

12. The method as claimed in claim 10, wherein said aperture forming step comprises a step of drilling the control electrodes and the substrate to form the apertures.

13. The method as claimed in claim 10, wherein said aperture forming step comprises a step of irradiating a laser beam from an excimer laser source to the control electrode to form the aperture.

* * * * *